United States Patent [19]
Schwarz

[11] Patent Number: 5,603,485
[45] Date of Patent: Feb. 18, 1997

[54] VALVE PLATE FOR A THERMOSTATIC VALVE

[75] Inventor: Wilhelm Schwarz, Marbach, Germany

[73] Assignee: Behr-Thomson-Dehnstoffregler GmbH & Co., Kornwestheim, Germany

[21] Appl. No.: 413,880

[22] Filed: Mar. 30, 1995

[30] Foreign Application Priority Data

Mar. 23, 1995 [DE] Germany ............ 295 04 952.9

[51] Int. Cl.⁶ ............................................. F16K 1/46
[52] U.S. Cl. ............... 251/332; 251/357; 137/516.29
[58] Field of Search ............................ 251/321, 322, 251/332, 337, 356, 357; 137/516.29

[56] References Cited

U.S. PATENT DOCUMENTS

| | | |
|---|---|---|
| 2,203,684 | 6/1940 | Hare . |
| 3,248,056 | 4/1966 | Obermaier ............ 251/332 |
| 3,346,233 | 10/1967 | Billson . |
| 3,558,097 | 1/1971 | DeFrees ............ 251/357 |
| 3,742,976 | 7/1973 | Bailey . |
| 4,611,629 | 9/1986 | Seiffert ............ 251/322 |

FOREIGN PATENT DOCUMENTS

| | | |
|---|---|---|
| 9100356 U | 7/1992 | Germany . |
| 61-59070 | 3/1986 | Japan . |
| 531134 | 1/1973 | Switzerland . |
| 2004032 | 3/1979 | United Kingdom . |

*Primary Examiner*—James Larson
*Attorney, Agent, or Firm*—Evenson McKeown Edwards & Lenahan, PLLC

[57] ABSTRACT

A valve plate in the form of a sheet metal preform is disclosed for a thermostatic valve. The preform includes an edge with a surrounding ring groove accommodating a rectangular cross section sealing ring. An exterior wall defining the ring groove is bent inward penetrating into the sealing ring to securely hold it in place.

10 Claims, 1 Drawing Sheet

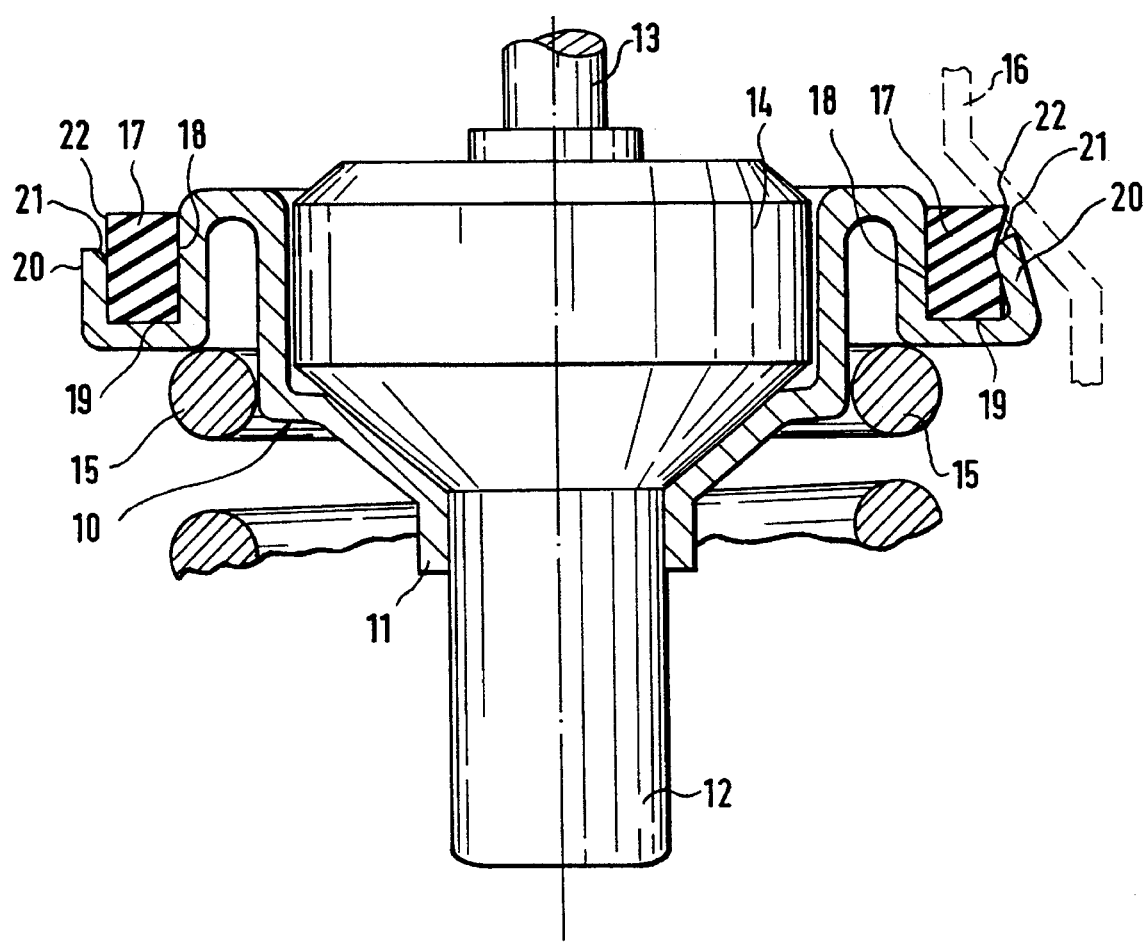

VALVE PLATE FOR A THERMOSTATIC VALVE

BACKGROUND AND SUMMARY OF THE INVENTION

This invention relates to a valve plate for a thermostatic valve comprising a basic body shaped as a sheet metal preform whose edge is provided with a surrounding ring groove in which a sealing ring is provided which is assigned to a valve seat.

A valve plate of the initially mentioned type is known (German Utility Patent DE 91 00 356), in which an O-ring is provided as a sealing ring. It is further suggested in the Utility Patent to provide the exterior edge of the surrounding ring groove with a section which extends in parallel to the stamping direction and to bend it again after the inserting of the sealing ring so that it surrounds a sealing ring, particularly a sealing ring with a non-circular cross-section, in a form-locking manner. It was found that it is relatively difficult to securely hold a sealing ring with a circular cross-section in the ring groove without any additional measures because the occurring flow forces have the effect of loosening the sealing ring out of its ring groove. This problem can be eliminated by means of the suggestion of providing the grooves with an exterior edge which is to be bent subsequently and which surrounds a sealing ring, particularly a sealing ring with a non-circular cross-section, in a form-locking manner. However, in order to be able to hold a sealing ring in a form-locking manner, it must receive a special shape which is connected with higher expenditures with respect to the manufacturing and therefore makes the sealing ring more expensive.

It is an object of the invention to provide a valve plate of the initially mentioned type in the case of which a sealing ring of a simple design is held in a sufficiently secure manner even when relatively high flow forces occur.

This object is achieved in that the ring groove has an interior boundary wall, a bottom and an exterior boundary wall, and in that the exterior boundary wall of the ring groove is bent toward the inside and, together with the bottom of the ring groove, encloses an angle of less than 90° into which the sealing ring penetrates which has an essentially rectangular cross-section, protrudes in the axial direction toward the outside beyond the exterior boundary wall, and is situated opposite the valve seat by means of its surrounding edge.

A sealing ring with a rectangular cross-section can be manufactured in a simple and low-cost manner because it can be cut off a hose; that is, it represents a short hose piece. The bent edge penetrating into the sealing ring securely holds the sealing ring also in the case of relatively high flow forces. Furthermore, the surrounding edge of the sealing ring, which is situated opposite the valve seat, provides a good sealing without the requirement of a relatively significant elastic deforming of the sealing ring.

In a further development of the invention, it is provided that the interior edge of the exterior boundary wall of the ring groove is rounded or bevelled. As a result, it is achieved that the interior edge of the exterior boundary wall which enters into the sealing ring does not damage the sealing ring.

In a further development of the invention, it is provided that the exterior boundary wall of the ring groove is shorter than the interior boundary wall which corresponds at least to the axial height of the sealing ring. Thus, it is achieved that the interior boundary wall supports the sealing ring in the radial direction so that, when placed against the valve seat, it is compressed and does not yield elastically.

BRIEF DESCRIPTION OF THE DRAWINGS

The single drawing figure represents a sectional view of a valve plate of a thermostatic valve according to the invention.

DETAILED DESCRIPTION OF THE DRAWING

The valve plate 10 is made, as a pressed part, of a rust-proof metal, particularly steel plate. The valve plate 10 is mounted on a housing 12 of a thermostatic working element which, in the interior, contains an expansion material which expands as a function of the temperature and which drives out a working piston 13 in the case of a corresponding temperature rise. The valve plate 10 has an interior collar 11 which is pressed onto the housing 12 and is supported in the axial direction on a thickening 14 of the housing. The valve plate 10 is loaded by means of a closing spring 15 which moves the valve plate 10 together with the housing 12 in the direction of a valve seat 16 outlined by a broken line when, at a correspondingly low temperature, the working piston 13 moves into the housing 12.

The edge of the valve plate 10 is constructed as a ring groove which is open in the axial direction and which receives a sealing ring 17. The sealing ring 17, which represents a hose section of a rubber-elastic material, has a rectangular cross-section. It is inserted into the, at first, rectangularly shaped ring groove which has an interior boundary wall 18, a bottom 19, and an exterior boundary wall 20. The height of the interior boundary wall 18 is at least as large as the corresponding axial height of the sealing ring 17 so that this sealing ring 17 is supported in the radial direction. The exterior boundary wall 20 has an axial height which corresponds to approximately three quarters of the axial height of the sealing ring 17.

As illustrated on the right-hand side of the drawing after the insertion of the sealing ring 17, the exterior boundary wall 20 of the ring groove is bent toward the interior by a predetermined path so that, together with the bottom 19 of the ring groove, it encloses an angle of less than 90°. In this case, the exterior boundary wall 20 of the ring groove penetrates by means of its edge 21 into the elastically yielding sealing ring so that this sealing ring is held in the ring groove in a clamping manner. The edge 21 is rounded or bevelled.

As also illustrated on the right-hand side of the drawing, the exterior edge 22 of the sealing ring 17 interacts with the valve seat 16 which is designed in a truncated-cone shape and which extends approximately at an angle of 45° with respect to the axial direction of the valve plate 10. Since, on its interior side, the sealing ring 17 is supported along its total height by the interior boundary wall 18 of the ring groove, it is compressed when its exterior edge 22 is placed on the valve seat 16. This results in a very secure sealing effect. The path along which the sealing ring 17 is compressed is bounded by the exterior boundary wall 20 of the ring groove of the valve plate 10 which, after a predetermined path, is placed against the valve seat 16. As a result, after this deformation path of the sealing ring 17, the force of the closing spring 15 is introduced from the valve plate 10 directly into the valve seat 16 so that the sealing ring 17 will then be relieved and will not be destroyed.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Valve plate for a thermostatic valve comprising a sheet metal preform having an edge with a surrounding ring groove in which a sealing ring having a substantially rectangular cross-section is provided which is engageable with a valve seat, wherein the ring groove has an interior boundary wall, a bottom and an exterior boundary wall, wherein the exterior boundary wall of the ring groove is bent radially toward the inside and, together with the bottom of the ring groove, encloses an angle of less than 90°, wherein said exterior wall penetrates into the sealing ring, and wherein the sealing ring protrudes in the axial direction beyond the exterior boundary wall of the ring groove and, by means of a surrounding edge, is situated opposite the valve seat.

2. Valve plate according to claim 1, wherein an interior edge of the exterior boundary wall of the ring groove is rounded.

3. Valve plate according to claim 1, wherein the exterior boundary wall of the ring groove is shorter than the interior boundary wall which corresponds at least to the axial height of the sealing ring.

4. Valve plate according to claim 3, wherein the interior boundary wall of the ring groove extends at an angle of 90° with respect to the bottom of the ring groove.

5. Valve plate according to claim 2, wherein the exterior boundary wall of the ring groove is shorter than the interior boundary wall which corresponds at least to the axial height of the sealing ring.

6. Valve plate according to claim 5, wherein the interior boundary wall of the ring groove extends at an angle of 90° with respect to the bottom of the ring groove.

7. Valve plate according to claim 1, wherein an interior edge of the exterior boundary wall of the ring groove is bevelled.

8. Valve plate according to claim 7, wherein the exterior boundary wall of the ring groove is shorter than the interior boundary wall which corresponds at least to the axial height of the sealing ring.

9. Valve plate according to claim 8, wherein the interior boundary wall of the ring groove extends at an angle of 90° with respect to the bottom of the ring groove.

10. A sheet metal preform for a thermostatic valve, said preform having an edge with a ring groove receiving a sealing ring having a rectangular cross-section, said sealing ring being engageable in use with a valve seat, wherein an exterior wall defining the ring groove is bent inward penetrating into the sealing ring.

* * * * *